US012564980B2

(12) United States Patent
Noniewicz et al.

(10) Patent No.: US 12,564,980 B2
(45) Date of Patent: Mar. 3, 2026

(54) CUTTING LOAD AND/OR BEVEL

(71) Applicant: wolfcraft GmbH, Kempenich (DE)

(72) Inventors: Zbigniew Noniewicz, Kempenich (DE); Lothar Woick, Hoenningen (DE)

(73) Assignee: wolfcraft GmbH, Kempenich (DE)

( * ) Notice: Subject to any disclaimer, the term of this patent is extended or adjusted under 35 U.S.C. 154(b) by 140 days.

(21) Appl. No.: 18/689,993

(22) PCT Filed: Sep. 9, 2022

(86) PCT No.: PCT/EP2022/075056

§ 371 (c)(1),
(2) Date: Mar. 7, 2024

(87) PCT Pub. No.: WO2023/036907

PCT Pub. Date: Mar. 16, 2023

(65) Prior Publication Data

US 2024/0399611 A1 Dec. 5, 2024

(30) Foreign Application Priority Data

Sep. 10, 2021 (DE) ...................... 10 2021 123 527.8
Sep. 10, 2021 (DE) ...................... 10 2021 123 529.4
Sep. 10, 2021 (DE) ...................... 10 2021 123 534.0
Sep. 10, 2021 (DE) ...................... 10 2021 123 535.9

(51) Int. Cl.
*B27G 5/02* (2006.01)

(52) U.S. Cl.
CPC .................................... *B27G 5/023* (2013.01)

(58) Field of Classification Search
CPC .................................. B27G 5/023; B27G 5/26
See application file for complete search history.

(56) References Cited

U.S. PATENT DOCUMENTS 192,139 A 6/1877 Traut
731,794 A 6/1903 Larson
751,908 A 2/1904 Goodell
798,818 A 9/1905 Morris
(Continued)

FOREIGN PATENT DOCUMENTS

DE 13538 C 9/1880
DE 114 591 C 1/1900
(Continued)

OTHER PUBLICATIONS

International Search Report in PCT/EP2022/075056, mailed May 19, 2023.

*Primary Examiner* — Omar Flores Sanchez
(74) *Attorney, Agent, or Firm* — Collard & Roe, P.C.

(57) ABSTRACT

A device for carrying out miter cuts includes two limbs which are secured to a central element in a pivotal manner in each case and so as to be fixable in pivoted positions. Each limb has a stop strip with a contact surface, wherein the contact surface lies opposite a counter contact surface formed by a counter stop. The distance between the contact surface and the counter contact surface can be adjusted by an adjusting element. Furthermore, the limbs and the central element are made of plastic, and a region of the central element from which the guide elements originate and which extends at least over the region between the guide elements has either a metal plate or an exchangeable sacrificial plate.

24 Claims, 11 Drawing Sheets

(56) References Cited

U.S. PATENT DOCUMENTS

| | | | | | |
|---|---|---|---|---|---|
| 876,266 | A | * | 1/1908 | Cassity | B27G 5/02 83/763 |
| 876,795 | A | | 1/1908 | Galentine | |
| 1,850,695 | A | | 3/1932 | Frank | |
| 3,709,266 | A | * | 1/1973 | Fusco | B27G 5/023 83/761 |
| 3,893,362 | A | * | 7/1975 | Schneider | B27G 5/02 83/827 |
| 3,901,498 | A | | 8/1975 | Novak | |
| 4,365,531 | A | * | 12/1982 | Potvin | B27G 5/02 269/283 |
| 4,437,375 | A | * | 3/1984 | Elmore | B27G 5/02 83/762 |
| 4,875,399 | A | | 10/1989 | Scott et al. | |
| 4,989,654 | A | * | 2/1991 | Berkeley | B27G 5/023 144/286.5 |
| 5,737,990 | A | * | 4/1998 | Freeland | B27G 5/023 33/534 |
| 6,401,584 | B1 | | 6/2002 | Rowe | |
| 6,604,294 | B1 | | 8/2003 | Farley | |
| 6,698,328 | B1 | | 3/2004 | Schmidt | |
| 6,829,972 | B2 | * | 12/2004 | Chen | B27G 5/02 83/761 |
| 7,950,636 | B2 | * | 5/2011 | Kinnison | B25B 5/142 269/41 |
| 2004/0000064 | A1 | | 1/2004 | Arnott | |
| 2008/0041211 | A1 | | 2/2008 | Gibbons et al. | |
| 2019/0152091 | A1 | | 5/2019 | Ursell et al. | |

FOREIGN PATENT DOCUMENTS

| | | | |
|---|---|---|---|
| DE | 35 29 855 | A1 | 2/1987 |
| DE | 199 38 426 | A1 | 4/2001 |
| DE | 101 07 766 | A1 | 9/2002 |
| DE | 10 2007 003 420 | A1 | 7/2008 |
| DE | 20 2007 016 558 | U1 | 4/2009 |
| DE | 20 2009 000 210 | U1 | 5/2009 |
| DE | 10 2015 113 591 | A1 | 2/2017 |
| EP | 0 162 402 | A1 | 11/1985 |
| EP | 3 138 674 | A1 | 3/2017 |
| EP | 3 191 273 | B1 | 11/2022 |
| FR | 2 817 892 | A1 | 6/2002 |
| GB | 305803 | A | 2/1929 |
| GB | 2049552 | A | 12/1980 |
| GB | 2366621 | A | 3/2002 |

* cited by examiner

Fig. 7
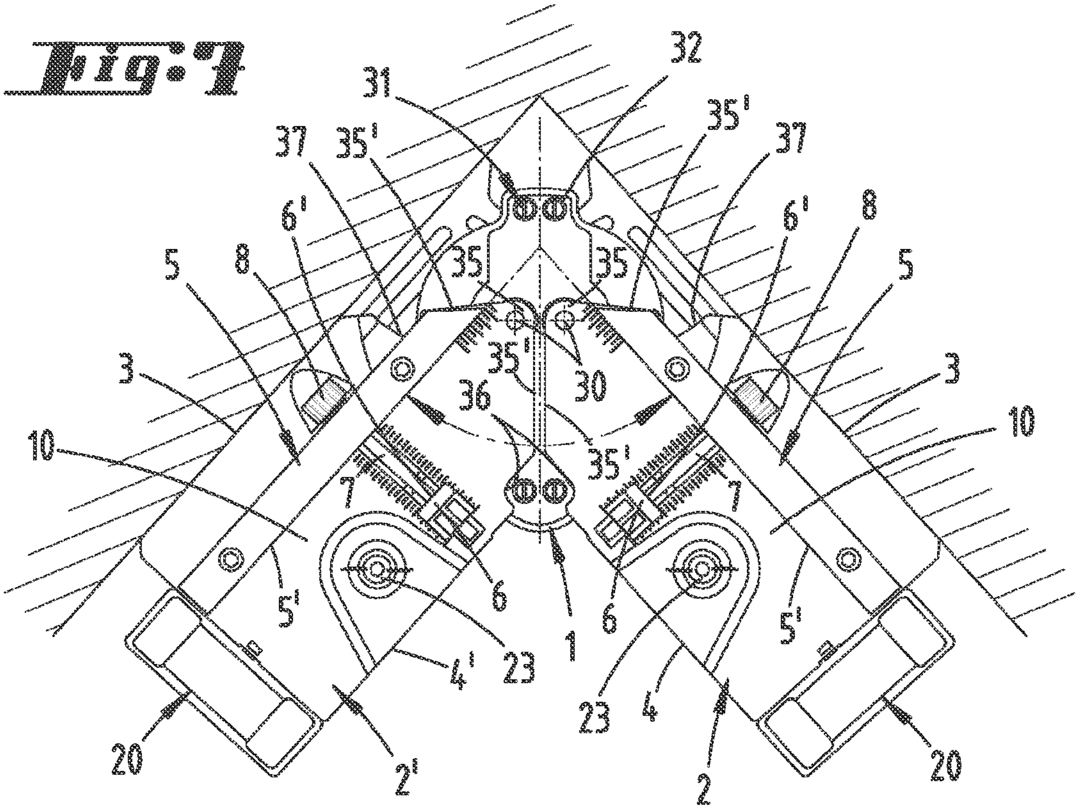
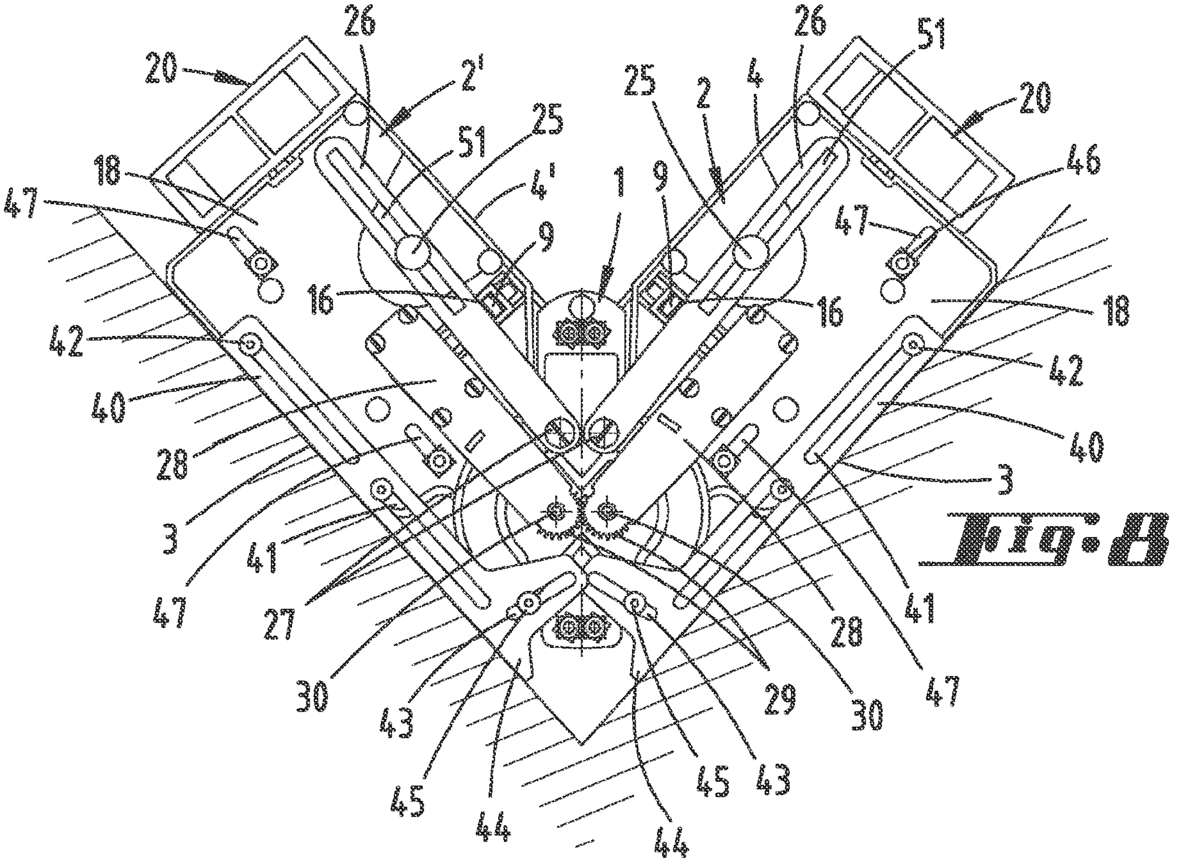
Fig. 8

CUTTING LOAD AND/OR BEVEL

CROSS REFERENCE TO RELATED APPLICATIONS

This application is the National Stage of PCT/EP2022/075056 filed on Sep. 9, 2022, which claims priority under 35 U.S.C. § 119 of German Application No. 10 2021 123 527.8 filed on Sep. 10, 2021; German Application No. 10 2021 123 529.4 filed on Sep. 10, 2021; German Application No. 10 2021 123 534.0 filed on Sep. 10, 2021; and German Application No. 10 2021 123 535.9 filed on Sep. 10, 2021, the disclosures of which are incorporated by reference. The international application under PCT article 21(2) was not published in English.

FIELD OF TECHNOLOGY

According to a first aspect of the invention, the invention relates to a device for carrying out miter cuts comprising two limbs, which are secured to a central element in a pivotable manner in each case and so as to be fixable in pivoted positions. The invention furthermore relates to a device comprising two limbs, which are secured to a central element in a pivotable manner in each case and so as to be fixable in pivoted position, wherein the limbs form a bevel flank in each case.

PRIOR ART

A device of the above-described type is known from the DE 10 2015 113 591 A1. The device described there has a central element, to which two limbs are secured. The two limbs can pivot with respect to one another by a 90 degree angle. The two longitudinal sides of the limbs facing away from one another form bevel flanks in order to measure the angles of two surfaces of a workpiece. A stop strip forms a contact surface for a workpiece, which is to be miter-cut. A counter contact surface lies opposite the contact surface. The counter contact surface is formed by a counter stop.

Devices, by means of which miter cuts can be made, are furthermore also known from the DE 114 591 A, DE 35 29 855 A1, DE 101 07 766 A1, DE 20 2007 016 558 U1, U.S. Pat. Nos. 798,818, 6,401,584 B1, US 2004/0000064 A1 and FR 28 17 892 A1.

A device, in the case of which the limbs can be pivoted about a positive as well as about a negative angle into an angular position, starting at a extended position, is known from the U.S. Pat. No. 5,737,990 A.

The GB 305,803 A discloses a miter box comprising two stops running parallel to one another, which act on one another by means of a tension spring, so that the stops can act as clamp.

A miter box, in the case of which a workpiece can be clamped between two clamping jaws, wherein one of the clamping jaws is formed as eccentric, is known from the U.S. Pat. No. 1,850,695.

The GB 2 049 552 describes a cutting table comprising a stop strip. A workpiece can be clamped against the stop strip by means of a clamp, which has a threaded shaft.

A sawing table, in the case of which a clamping element can be adjusted by means of a threaded spindle with respect to a stop strip, is already known from the U.S. Pat. No. 4,365,531.

The US 2008/0041211 A1 describes a sawing table comprising different counter stops, by means of which a workpiece can be pushed against a stop strip.

The GB 2 366 621 A describes guide pins for guiding a saw blade, which are formed by rotatable round pieces.

Guide elements for a saw blade, in the case of which sleeves are arranged, which can be rotated about a shaft, are known from the EP 0 162 402 A1. End sections with enlarged diameter are provided for axially constraining the sleeves.

The DE 13 538 A describes a miter saw comprising two limbs, which can be pivoted with respect to one another.

The U.S. Pat. No. 3,901,498 A describes a sawing table comprising stops, wherein the stops are secured in a shiftable manner to angular carrier bodies. For this purpose, securing screws are inserted in longitudinal slits of a section of angle, which protrudes vertically from the sawing table.

A bevel, in the case of which two limbs, which are pivotable with respect to one another, have rails, which can be displaced parallel to the bevel flank in each case, is already known from the DE 1 993 8426 A1, the DE 10 2007 003 420 A1 and the US 2019/0152091 A1.

SUMMARY OF THE INVENTION

The invention is based on the object of improving one of the above-described devices, namely in particular a device for carrying out miter cuts or a bevel with regard to handling or to further develop them in a manner, which is advantageous for their use.

The object is solved by means of the invention specified in the claims. The subclaims do not only represent advantageous further developments of the invention specified in the independent claims but also independent solutions of the object.

According to a first aspect of the invention, the securing of a workpiece, for example of a profile strip, between the contact surface and the counter contact surface is to be improved. For this purpose, the distance between the contact surface and the counter contact surface is to be capable of being adjusted by means of an adjusting element. It can be provided thereby that the adjusting element has a rotary knob. The adjusting element can also or additionally have an adjusting spindle comprising a thread. The adjusting spindle can be secured rotatably but axially firmly to the limb of the device. The thread of the adjusting spindle can engage with a counter thread. The counter thread can be firmly assigned to the counter stop. It can be provided that the counter stop has a foot. The foot can protrude into a slit of a bearing surface of the limb. The bearing surface serves the purpose of supporting the workpiece. Each limb can have a bearing surface. The bearing surfaces of the two limbs preferably lie in a common plane. A cage, in which a nut made of metal lies, for example a square nut, can be located in the foot of the counter stop, which can consist of plastic. To guide the counter stop in the direction towards the stop strip, rims of the slit can engage with recesses of the foot. Ribs, for example guide ribs, between which the foot is guided, can extend below the bearing surface. To mount the adjusting spindle in a rotationally fixed manner to the housing of the limb, the adjusting spindle can have an annular groove. The annular groove can be directly adjacent to a rotary knob, which is firmly connected to the adjusting spindle. The housing of the limb can have a recess, in which the adjusting spindle is mounted. The recess can have a rim, which engages with the annular groove. The recess can be open towards the top, so that the adjusting spindle can be inserted there. In the assembled state, the recess can be closed from an underside of the stop strip. By means of a further development of this type, the angle, at which a profiled workpiece is inclined with respect to the contact surface or the bearing surface, can be set. For example, an upper edge of the workpiece can abut against the contact surface of the stop strip. A lower rearward edge of the workpiece can abut against the counter contact surface of the counter stop. If the counter stop is now displaced towards the stop strip or is displaced away from the stop strip by rotating the rotary knob of the adjusting spindle, then the angle changes, at which the workpiece lies in the shaft between contact surface and counter contact surface.

According to a second aspect of the invention, the application range of the device is expanded to long workpieces. Bearing supports are provided for this purpose. Two bearing supports are preferably provided, wherein each bearing support is secured to the free end of a limb. The bearing support is secured in a releasable manner to the free end. It is in particular provided that the securing takes place by inserting a protrusion into a groove. This can take place from the bottom to the top. On its free end, the bearing support can have a dovetail groove. The protrusion can have undercut flanks. When pushing protrusion and dovetail groove into one another, the undercut flanks of the protrusion engage with the undercut groove walls of the dovetail groove. The dovetail groove can be open towards an underside of the limb, which faces away from the bearing surface of the limb. The dovetail groove can extend only in some regions over a front surface of the free end of the limb. It can be closed towards its side facing the bearing surface. It can be provided in a further development that the bearing support has a depression, which is flanked by two protrusions. A surface formed by the depression is flush with the bearing surface. The bearing support is secured in a releasable manner to the limb. If the bearing support is secured to the limb, it then forms an extension of the bearing surface. If the bearing support is released from the limb, then it can support the workpiece in a position spaced apart from the limb.

According to a third aspect of the invention, guide elements are secured to the central element, by means of which a saw or another tool can be guided. The guide elements are formed by two adjacent guide pins in each case. To simplify the guidance of the tool, it is proposed that the guide pins have a shaft, on which at least one sleeve is rotatably mounted. When moving the tool back and forth, the sleeves roll on the broadside surfaces of the tool. In a further development of the invention, it can be provided that exactly or at least four guide pins are provided. It can further be provided that each of the several guide pins carries several sleeves. It is in particular provided that at least one guide pin or each guide pin carries two sleeves, which are arranged one on top of the other in the axial direction. It is also provided that the sleeves are secured rotatably but axially non-displaceably to the shaft. The sleeves can consist of plastic. The shaft preferably consists of metal. In a further development of the invention, it is provided that the sleeve has a cavity, into which a protrusion protrudes, which engages with an annular groove of the shaft. The protrusion can be formed by a spring tongue of the sleeve. The spring tongue can be formed by a cut-free section of the wall of the sleeve. The spring tongue can sit on a front end of the sleeve.

According to a fourth aspect of the invention, guide elements secured to the central element are provided, between which a gap extends, through which a saw blade or the blade of a knife can engage. According to the invention, this distance is adjustable, so that saws with different blade thickness or knives with different blade thickness can be used. The two guide elements, which are in particular designed identically, of a pair of guide elements can be formed by pins, as they have been described above. The pins can have a threaded section, with which they are screwed into threaded elements. The threaded elements are in particular nuts with a non-round outline. In different rotational positions, the nuts can be inserted in depressions of the central element. The depressions can be open towards the rear side, which is opposite to the bearing surface. In the different rotational positions, the axes of the internal threads of the nuts have distances, which differ from one another. The nuts can be polygonal nuts. It is in particular provided that they are square nuts. The threaded sections preferably engage through elongated holes of the central element or elongated holes of a sacrificial plate or of another plate, which is assigned to the central element. It is preferably provided that in a first rotational position, in which the distance of the centers of the internal threads of the nuts is small, the square nuts have polygonal flanks, which run parallel to one another. By rotating the shafts, the threaded sections of the shafts can be unscrewed from the nuts. The nuts released from the shafts in this way can be inserted in the depressions in a different rotational position. In this rotational position, polygonal corners of the nuts can protrude beyond a central line between the axes of the shafts. The depression, in which the nuts can lie in the different rotational positions, can have a square section, wherein a free space is provided between the two square sections. Corner recesses are additionally provided, in which the polygonal corners of the nut can lie in a rotated position. One polygonal section of the nut can in each case engage behind the free space in this rotational position. The device preferably has two such pairs of guide elements, wherein the distances of the individual guide elements of a pair of guide elements can be adjusted by repositioning threaded elements. The threaded sections preferably engage through elongated holes of the central element.

It is further provided that, from a first right-angled position, in which the contact surfaces assume a 90 degree angle to one another, the limbs hinged to the central element can be pivoted into an extended position. In the extended position, the contact surfaces of the two stop strips lie in a common plane. To expand the application range of the device, it is proposed that the two limbs can be displaced beyond the extended position all the way into a further right-angled position, in which the contact surfaces assume a 270 degree angle to one another. It is thus possible to be able to pivot the limbs relative to one another by at least 180 degrees, preferably by at least 190 degrees or 185 degrees with respect to one another. In each of the angles between these two pivoted end positions, the limbs can be blocked from pivoting against one another or with respect to the central element, respectively. It can be provided that the limbs have acute-angled ends in each case. The acute-angled ends have side surfaces, which are at an angle to one another, which is maximally 90 degrees. The angle can be smaller than 90 degrees. In the two pivoted end positions, the side surfaces of the ends, which differ from one another, of the limbs, can lie in a parallel position to one another. It can further be provided that the side walls have nooks, which have a distance from a pivot axis, by means of which the ends are hinged to the central element. In the respective pivoted end positions, the guide elements enter into these nooks. The ends of the limbs have side walls running in a roof-shaped manner to one another, wherein the pivot axis, about which the respective limb can pivot with respect to the central element, is arranged directly adjacent to the tip of this roof-shaped arrangement of the side walls.

According to a fifth aspect of the invention, the central element is made of plastic. The limbs can likewise be made of plastic. To protect the central element, a metal plate or a sacrificial plate can be located in the region between the two guide elements, thus along the line, along which the tool is guided by the guide elements. The metal plate and/or the sacrificial plate can be exchangeable. The sacrificial plate can consist of wood or plastic. In the case of a diagonally positioned saw, the saw toothing of the saw can, as a result of this design, engage with the sacrificial plate, which can be exchanged when a cut into the sacrificial plate has reached a certain depth. The surface of the central element facing upwards, to which the limbs can also be hinged, can form a depression, in which the metal plate or sacrificial plate lies.

According to a sixth aspect of the invention, the device is a bevel or the device can be used as bevel. Each of the two limbs forms a bevel flank, which can be applied to a surface of a workpiece or the like in order to measure the angle of the two surfaces by pivoting the limbs with respect to one another. To improve the application range and to simplify the handling of the device, it is proposed that the bevel flank is formed by an outer edge of a rail. The rail can be capable of being displaced in the direction of extension of the bevel flank with respect to the limbs carrying it. One end of the rail can be secured to the central element. For this purpose, the rail can form a control slit, which is at an angle to an elongated hole, with which a pin engages in order to secure the rail to the limb. As a result of this mechanical coupling of the rail to the limb and the central element, the rail shifts during the pivoting of the limbs. Each of the two limbs forms a rail. The two rails lie at different height levels, so that they can glide one on top of the other. The rails have free ends, which, in a pivoted position of the limbs, in which the contact surfaces assume a 90 degree angle to one another, are spaced apart from one another. In a pivoted position, in which the contact surfaces are aligned with one another or in which the contact surfaces assume an angle of more than 180 degrees to one another, the rails can lie one on top of the other. The outer edge of the rails can intersect at a right angle in a 270 degree pivoted position of the two limbs. Not only internal angles, but also external angles can be measured by means of these rails. The rail or the strip, which the bevel flank forms, can be secured to the underside of a body forming the limb by means of screws or the like. The body can be a hollow body and can consist of plastic. The body can form an apron, which extends parallel to the stop strip and which flashes the rail or strip. A nook, in which the strip or rail extends, can be located below the apron. The housing can support itself on a ground by means of feet. The rail or strip, which forms the bevel flank, can be arranged in a recess, which is open towards the bottom, at a small distance above a base of the limb. The bevel flank can run flush with a vertical front wall of the apron or of the body.

According to a seventh aspect of the invention, the device is to be formed or further developed to the effect that short workpieces can also be cut to length in the different cutting angles. For this purpose, the distance of the two stop strips from one another can be adjusted in order to decrease the width of the opening between the two stop strips when cutting a 90 degree miter. If the limbs are brought into a pivoted position of greater than 90 degrees, then the stop strips can be spaced apart from one another. The stop strips can be shifted in such a way that they touch or almost touch one another in a 180 degree position. The stop strips are secured to the limb so as to be capable of being shifted and/or offset in their direction of extension. For this purpose, securing elements engage with elongated holes. The stop strip preferably has two bores, with which a securing screw engages in each case, which engages through an elongated hole of a housing of the limb in each case. On the side of the bearing surface facing away from the stop strip, a nut can be located, which is non-rotatably mounted in a groove. It can be a square nut. The bore, in which the securing screws are inserted, can be a stepped bore. The threaded shaft of the screw engages through a lower section of the bore, which has a small diameter. The head of the securing screw can abut against one step of an upper section of the bore, which has a larger diameter. Several bores for the securing screws can be arranged next to one another, so that the shifting distance, about which the stop strips can be displaced, is enlarged by repositioning the stop strip.

According to an eighth aspect of the invention, the stability of the device in the respective pivoted position is to be improved. For this purpose, two blocking means are provided, by means of which the pivotability of the limbs can be blocked. Each of the two blocking means can have an actuating element, which can be brought from a release position into a blocking position. It is provided that the two limbs can be pivoted against one another only if both actuating elements are in the release position. Each of the two limbs preferably has an actuating element. A clamping element can be brought from a clamping position into release position by means of the actuating element. It can be provided that two fixing levers are pivotably hinged to the central element. The fixing levers are hinged to the central element at a hinge point, which is offset with respect to the pivot axis of the limb. The fixing lever can have an elongated hole, through which a clamping screw engages. The actuating element can be a nut and in particular a wing nut, which is screwed onto the clamping screw in order to clamp the fixing lever. In a further development of the invention, it can be provided that the bearing surface forms a depression, in which the actuating element is arranged. The height of the actuating element is thereby preferably smaller than the depth of the depression, so that the actuating element does not protrude into the plane of the bearing surface. The actuating element can thus locally also be arranged where a workpiece can support itself when using the device. The actuating element can preferably even have a smaller distance from the contact surface than the maximum distance of the counter contact surface to the contact surface.

The central element can have a central region having an essentially circular or oval outline. The two limbs are hinged to this central region by means of their pivot axes. In a diametrically opposite position, an arm can protrude from the central region in each case. A guide element for guiding the saw is arranged on the end of each arm. A metal plate, which forms a pivot arm, can extend on the underside of the housing forming the limb. The pivot arm is secured to the pivot bearing and has a toothing there, which extends over a semi-circle. The toothings of the two pivot arms engage with one another, so that the two limbs pivot synchronously with respect to the central element. The ends of the pivot arms located opposite the toothing are secured to the plastic housing of the respective limb. On the one hand, the limb can be lengthened by means of the bearing support, which is secured in a releasable manner to a limb. On the other hand, the bearing support, however, can also be used as carrier for long workpieces in a remote position from the limb. With the protrusion engaging with a dovetail groove, the bearing support can be connected to the free end of the limb by means of a shifting movement.

In that the bearing support has a depression flanked by two humps or protrusions, the workpiece can securely lie on the bearing support, when it engages with the depression.

In that, on a front end, the sleeve has a spring tongue, which engages with an annular groove of the shaft, the diameter-larger head section on the shaft, which is required in the prior art, can be forgone. The sleeve is connected to the shaft via a latching connection, which extends between sleeve inner wall and the outer jacket surface of the shaft. This also simplifies the assembly.

In that in the case of a device for carrying out miter cuts, the stop strip is secured to the limb by means of a releasable connection by means of securing elements engaging through bores of the stop strip and elongated holes of the limb, the stop strips can be laterally offset. In that the elongated holes thereby extend in the bearing surface, an angular holder is not required. There are preferably no further means protruding from the bearing surface, by means of which the stop strip is secured.

It is further advantageous when, to fix the pivoted position of the two limbs, the actuating elements are arranged in a depression of the bearing surface in each case. The actuation can then take place from the top, even though the entire surface is available for supporting a workpiece.

The further development according to the invention of a bevel provides that the rail is coupled to a limb in such a way that a pivoting of the limb shifts the rail. The rail thus shifts independently when changing the angle. It is further advantageous when the rail is secured to the limb as well as to the central element. This coupling to two parts, which can be moved by each other, makes it possible that the rail displaces during the pivoting.

BRIEF DESCRIPTION OF THE DRAWINGS

An exemplary embodiment of the invention will be described below on the basis of enclosed drawings, in which:

FIG. 7 shows a top view onto the miter box in a 90 degree position of the two limbs 2, 2', FIG. 8 shows a bottom view of the miter box in the position illustrated in FIG. 7.

DESCRIPTION OF THE EMBODIMENTS

Figure 1:
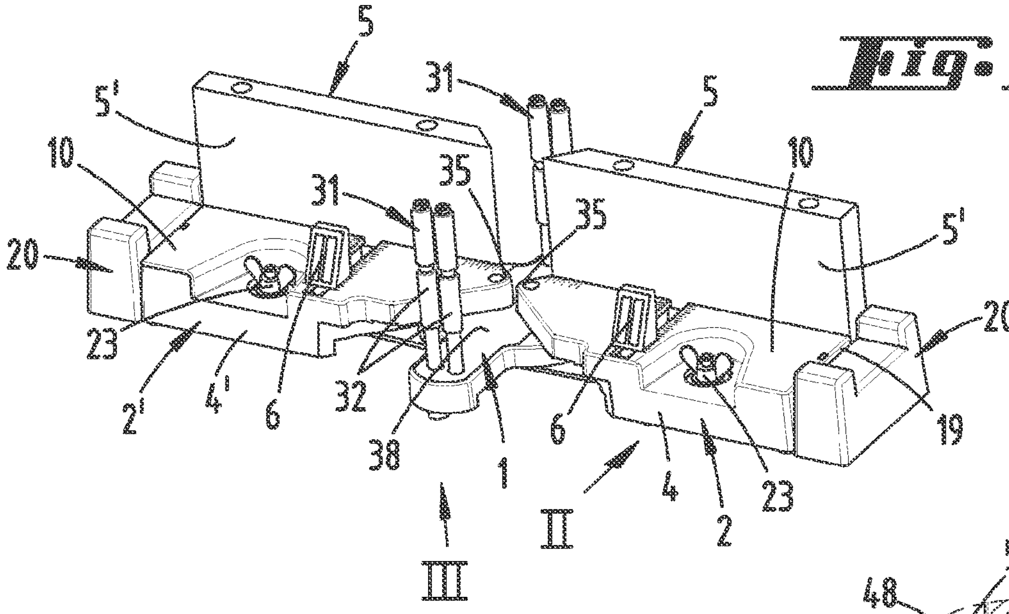
FIG. 1 shows a miter box in a perspective illustration.

On the one hand, the tool illustrated in the figures is a miter box, by means of which workpieces 50 can be cut, wherein the angle of the cut can be set by pivoting two limbs 2, 2' with respect to a central element 1.

On the other hand, however, the tool is also a bevel, by means of which an angle of two surfaces of a workpiece or of a building wall or the like can be measured.

Most preferably, however, the tool illustrated in the figures is a combination of a miter box and of a bevel, in the case of which the angle can be measured by means of two bevel flanks 3 and in the case of which two stop strips 5 are brought exactly into the angle, in order to be able to cut a bevel angle corresponding to the measured angle on the workpiece, when measuring the angle.

A central element 1 has a central region with an essentially circular outline and is formed by a hollow body made of plastic. The central region is followed by opposing arms, which in each case carry two guide pins 31 standing close together. Together, two guide pins 31 form a guide element in each case for guiding a tool 49, for example a saw. The guide pins 31 have shafts 33. The shafts 33 have a circular cross section and consist of metal. Each shaft 33 supports at least one sleeve 32. In the case of the exemplary embodiment, each shaft 33 supports two sleeves 32, which are arranged axially one behind the other and which can rotate about the shaft 33.

Figure 5:
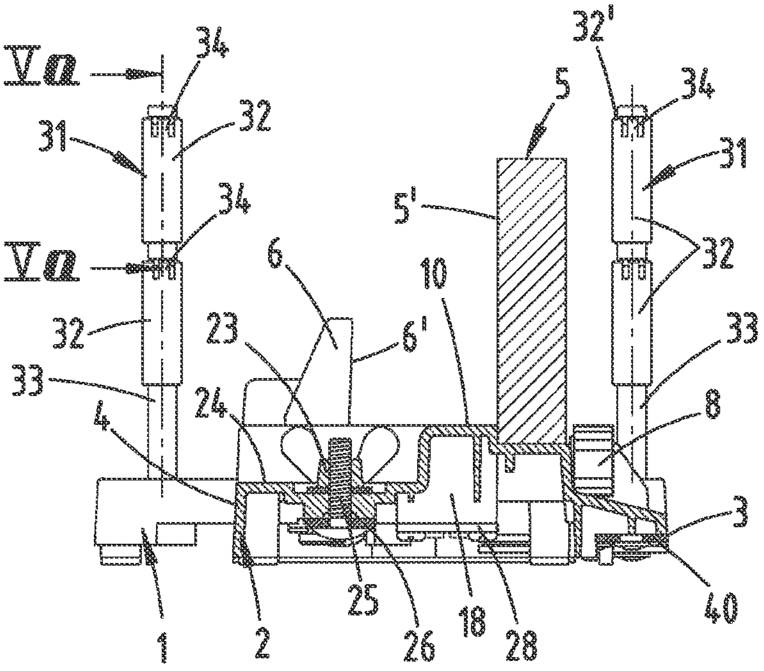
FIG. 5 shows the section according to the line V-V in FIG. 2.
Figure 5A:
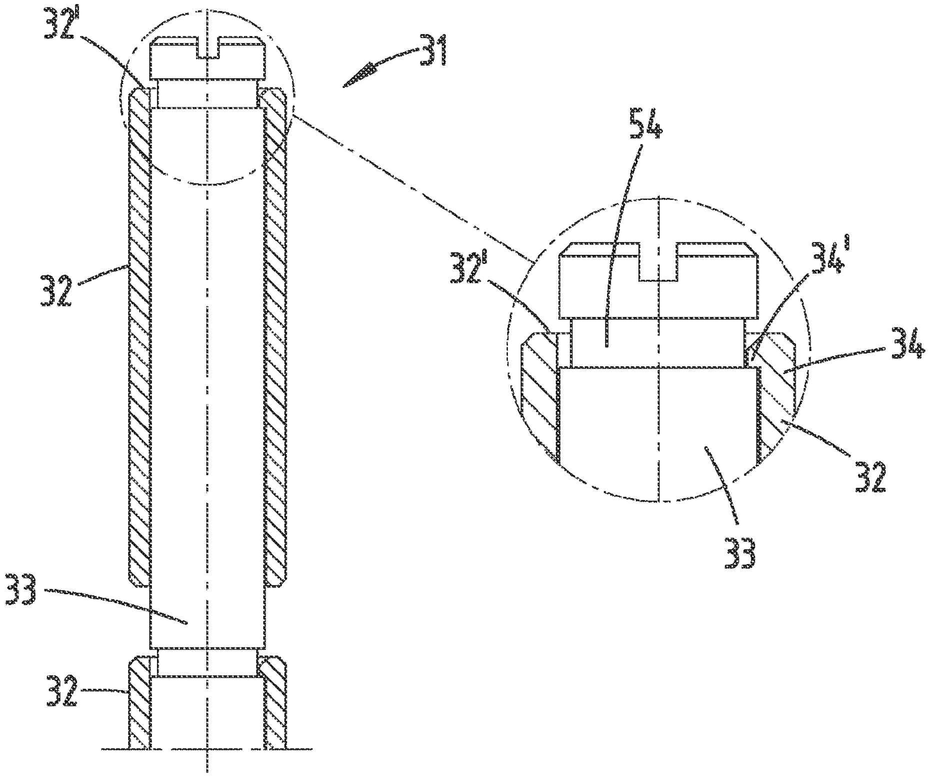
FIG. 5*a* shows the section according to the line Va-Va in FIG. 5.
Figure 6:
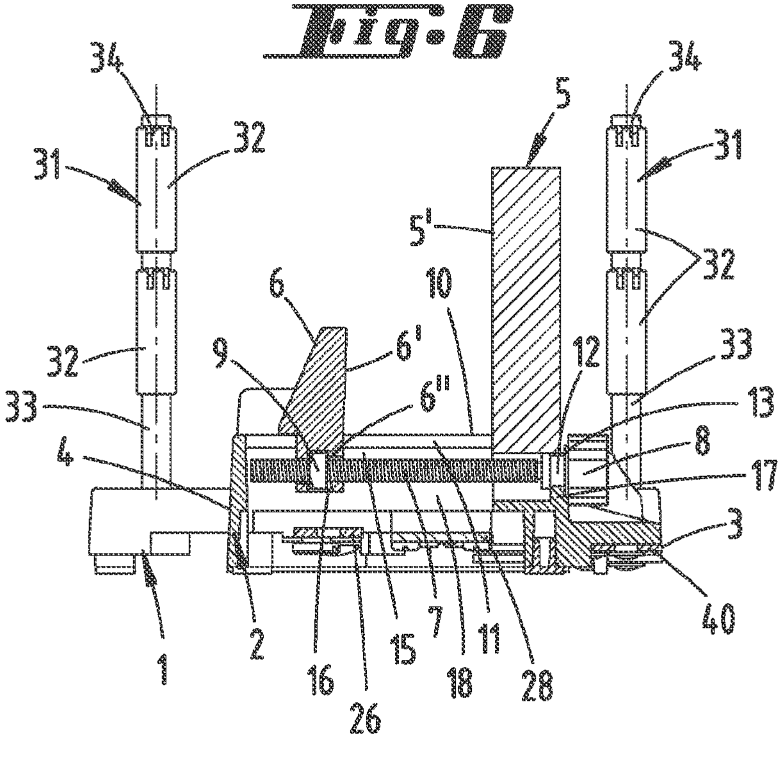
FIG. 6 shows the section according to the line VI-VI in FIG. 2.

The sleeves 32 are secured to the shaft 33 in a rotatable but axially firm manner (see FIG. 5*a*). On one of their free ends, the sleeves 32 consisting of plastic or of an easily machinable material have two parallel notches in each case, which are open towards the end of the sleeve 32. A spring tongue 34, which forms a protrusion 34' protruding into the cavity of the sleeve 32, extends between the two notches. The shaft 33 consisting of metal has an annular groove 54, with which the protrusion 34' engages, in order to hold the sleeve 32, which can be rotated about the shaft 33 in this way, on the shaft 33 in a releasable manner.

Figure 9:
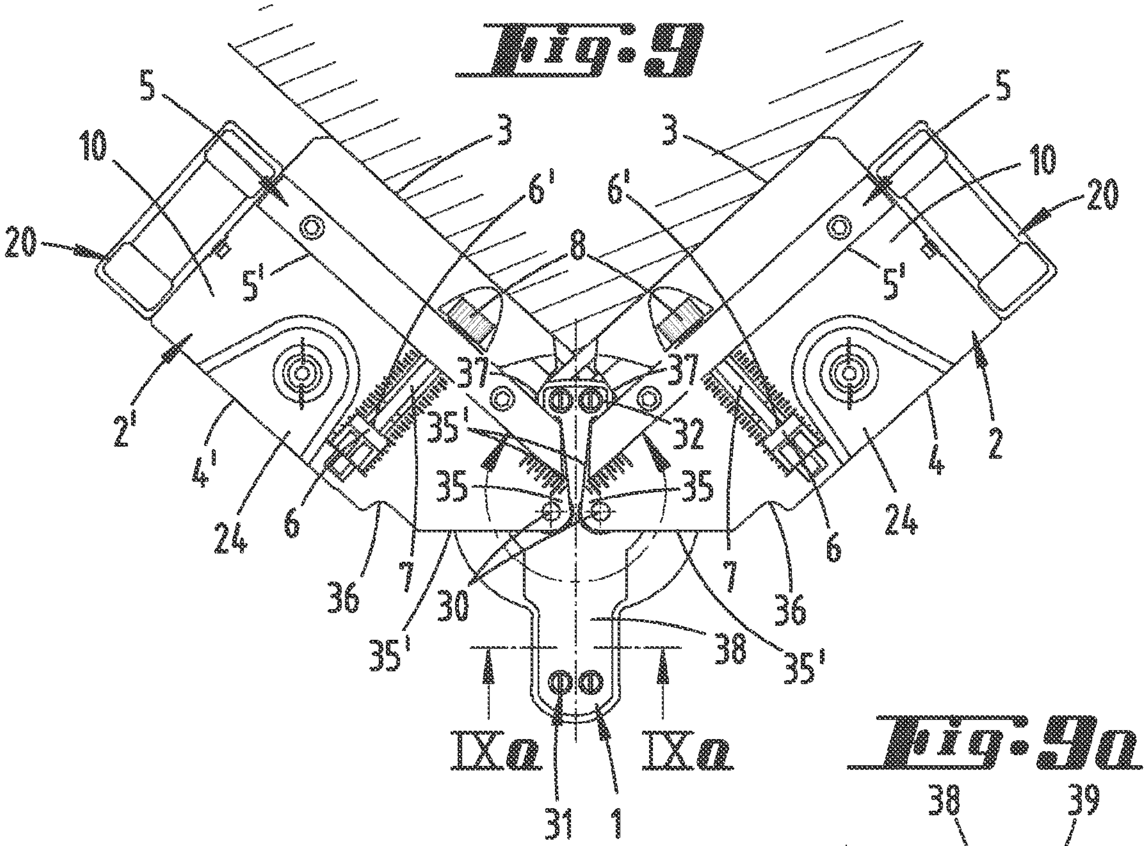
FIG. 9 shows a top view onto the miter box in a 270 degree position of the two limbs 2, 2'.
Figure 9A:
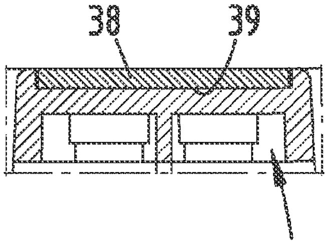
FIG. 9*a* shows the section according to the line IXa-IXa in FIG. 9 in an enlarged manner.

The surface of the central element 1 facing upwards in the use position has an insert 38 made of wood or of an easily machinable material or also of metal (see FIG. 9*a*). The insert can form a sacrificial plate, which can be exchanged. The insert, however, can also form a protective plate made of metal or the like. The insert 38 can lie in a recess 39.

Figure 3:
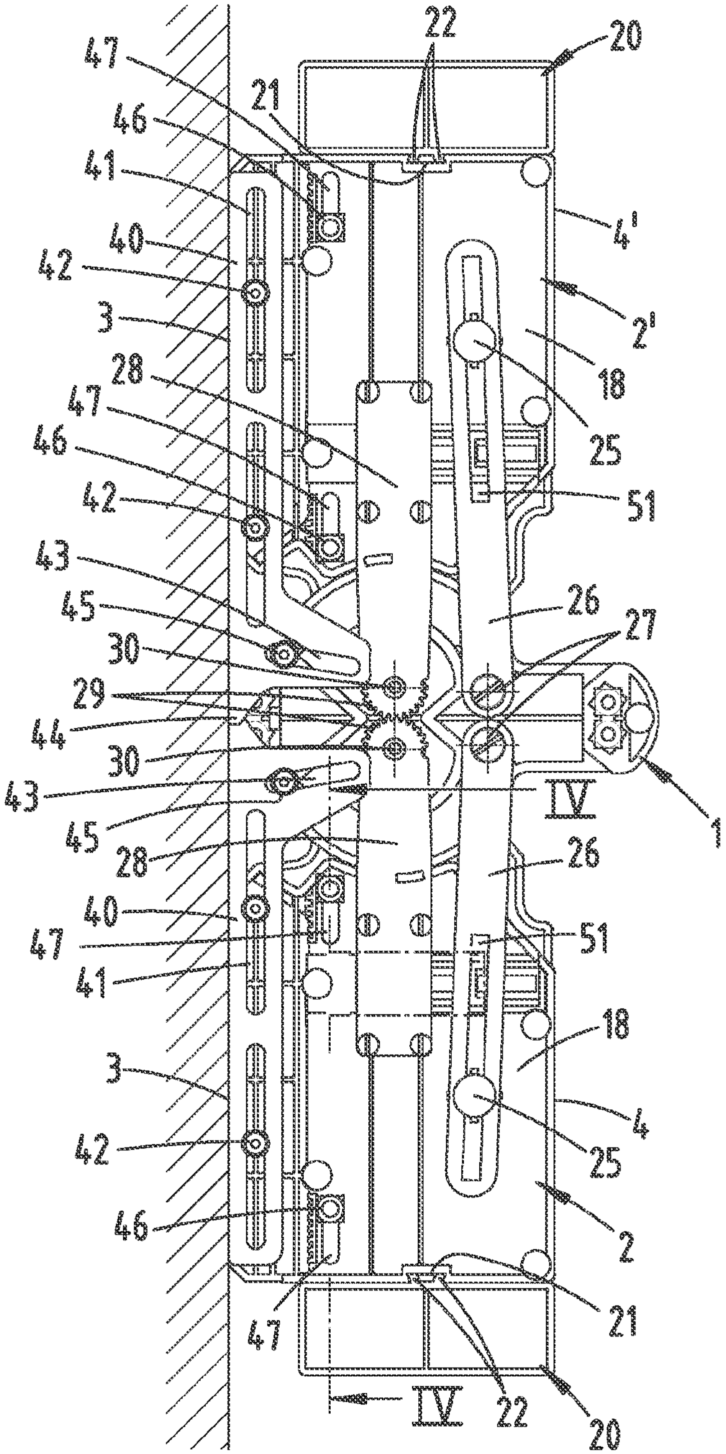
FIG. 3 shows the miter box in a bottom view in an extended position of the two limbs 2, 2'.

Two limbs 2, 2' are hinged to the central element 1 in a symmetrical manner. The limbs 2, 2' are hinged to the central element in such a way that they can be pivoted from a 90 degree position illustrated in the FIGS. 7 and 8, via an 180 degree position illustrated in the FIG. 3, all the way into a 270 degree position illustrated in the FIGS. 9 and 10. For this purpose, the two limbs 2, 2' are connected in each case to the central element 1 with end sections 35, which stand at acute angles to one another, via respective pivot bearings. The pivot bearings form pivot axes 30, about which the limbs 2, 2' can be pivoted.

In the two pivoted end positions, the side walls 35' of the acute-angled end 35 of the two limbs 2, 2' can run parallel to one another. They can be spaced apart from one another, so that a saw blade can step between adjacent side walls 35'.

The side walls 35' have nooks 36, 37 in each case, into which the guide elements 31, 32 can step in the two pivoted end positions (FIG. 7, 8; FIG. 9, 10).

The limbs 2, 2' are formed by hollow bodies made of plastic in each case. The hollow bodies, which are open towards the bottom, form a cavity 18. A pivot arm 28 made of metal is secured in the cavity 18. With an end section toothed over a semi-circle, the pivot arm 28 extends all the way below the acute-angled end 35 and likewise forms a portion of the pivot bearing, so that the pivot axis 30 extends through the central point of the two toothings 29, which extend over a semi-circular arch and which engage with one another in order to synchronize the pivot movement of the two limbs 2, 2'.

Rotary bearings 27, to which fixing levers 26 are secured, are provided at a distance from the pivot axes 30, approximately at the same distance, at which the two pivot axes 30 are spaced apart from one another. The fixing levers 26 have an elongated hole 51 in each case and extend over a majority of the length of the limbs 2, 2'. Clamping screws 25, by means of which the fixing levers 26 can be clamped to the housing of the limbs 2, 2', engage with the elongated holes 51.

The clamping screw 25 engages through an opening of the housing wall of the limb 2, 2'. A securing element, for example in the form of a wing nut 23, is screwed onto a threaded shaft of the clamping screw 25. The exemplary wing nut 23 supports itself on a washer. The securing element is arranged in a depression 24.

A total of two or at least two clamping screws 25 are provided, wherein one of the two limbs 2, 2' can be pivotably blocked individually with respect to the central element 1 by means of each of the two clamping screws 25. Due to the fact that the two limbs 2, 2', however, are mechanically coupled to one another via toothings 29 engaging with one another, the two limbs 2, 2' can only pivot with respect to one another if both clamping screws 25 are released simultaneously.

On their side facing upwards in the operating position, the limbs 2, 2' form bearing surfaces 10, which are aligned with one another and onto which a workpiece 50 to be cut can be placed. The depression 24 extends on a lower level than the stop surface 10 in such a way that the securing element 23 does not protrude beyond the plane, in which the bearing surface 10 extends. The depression 24 extends in a region, onto which a workpiece 50 can be placed when using the device.

Each of the two limbs 2, 2' has one or at least one stop strip 5 comprising a contact surface 5' for contacting a workpiece or an edge of a workpiece 50. The contact surface 5' stands at a right angle to the bearing surface 10. One or at least one counter contact surface 6' is assigned so as to lie opposite to the contact surface 5'. The counter contact surface 6' is formed by one or at least one counter stop 6, on which a different edge of the workpiece 50 can support itself.

The stop strip 5 has an upper long narrow side and a lower long narrow side. Bores for inserting a securing screw extend in the two narrow sides. The stop strip 5 furthermore has short narrow sides. A short narrow side extends at a right angle to the contact surface 5'. The other short narrow side extends so as to run obliquely to the contact surface 5', wherein the angle of inclination, which the short narrow side has to the contact surface 5', can have 45°. At least two bores are preferably provided, wherein these two bores are arranged in the region of the respective end of the long narrow sides. The bores can have an identical or similar distance from the short outer edge of the contact surface 5'.

The counter stop 6 can be displaced in such a way that the distance of the contact surface 5' from the counter contact surface 6' can be set. An adjusting device, which can be actuated via a rotary knob 8, is provided for this purpose.

The adjusting device has an adjusting spindle 7 extending in the adjusting direction, transversely to the extension of the contact surface 5', comprising an external thread. A collar, which forms an annular groove 12, adjoins the rotary knob 8, which is firmly connected to the adjusting spindle 7. The annular groove 12 is mounted in a recess 13 (see FIG. 2). The recess is open towards the top, thus towards the bearing surface 10, and is closed by the stop strip 5, which is secured in a releasable manner to the limb 2, 2'.

Figure 4:
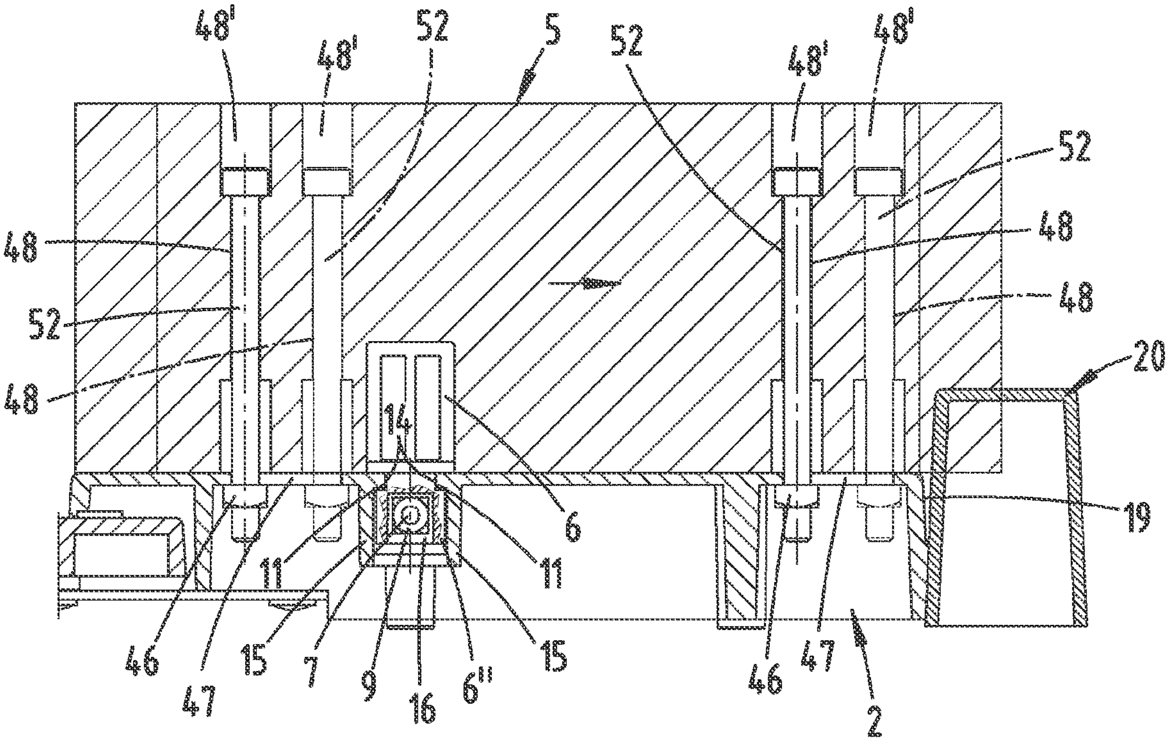
FIG. 4 shows the section according to the line IV-IV in FIG. 3.

A slit 11, the slit width of which is greater than the diameter of the adjusting spindle 7, extends above the adjusting spindle 7 parallel to the adjusting spindle 7. The counter stop 6 is guided in the slit 11. For this purpose, the counter stop 6 has recesses 14 (see FIG. 4), with which a rim of the slit engages in each case.

The counter stop 6 forms a foot 6", which is arranged below the level of the bearing surface 10 and in which a cage 16 is located, which receives a nut 9, in particular a square nut 9. The thread of the adjusting spindle 7 is screwed into this nut 9.

The two side surfaces of the foot 6", which face away from one another, can touch ribs 15, which, on the one hand, can serve the purpose of reinforcing the housing of the limbs 2, 2', but, on the other hand, can also form a guide function for the counter stop 6.

Figure 11:
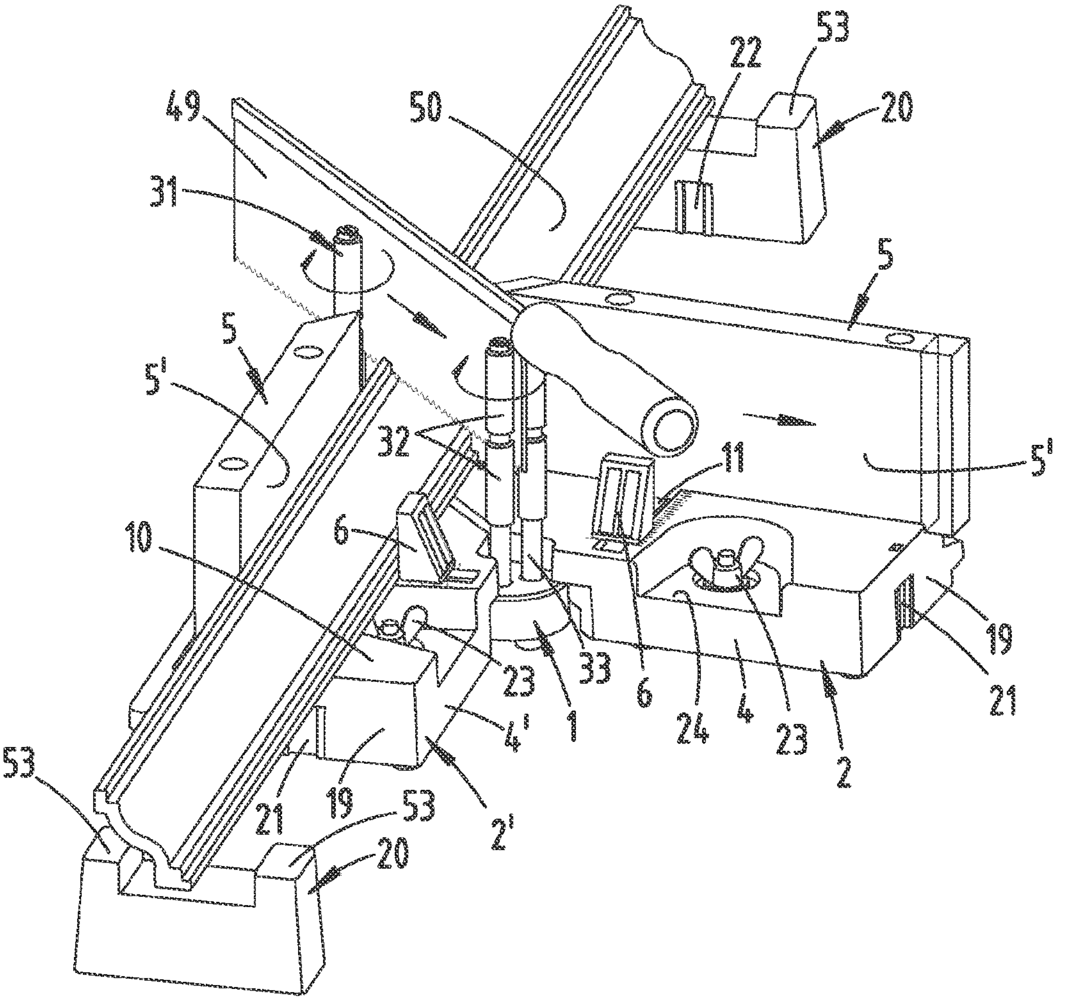
FIG. 11 shows the miter box in an operating position for cutting a 90 degree miter, wherein a counter stop 6 has a first distance from a stop strip 5.

The function of the counter stops 6 can be described with reference to the FIGS. 11 and 12. The FIG. 11 shows a workpiece 50 in the form of a profile strip, which has an upper edge, which supports itself on the contact surface 5' and which has a lower edge, which supports itself on the counter contact surface 6'. The workpiece 50 is thus held in an angular position between the two surfaces 6', 5'. If the distance of the two surfaces 5', 6' is changed, the angular position of the workpiece 50 thus changes and, associated therewith, also the spatial angle, with which the cut is carried out by means of the saw 49.

On its side facing away from the central element 1, the two limbs 2, 2' form front surfaces 19. The front surfaces are formed by the free ends of the limbs 2, 2'.

A dovetail groove 21, which is open towards the bottom but closed towards the bearing surface 10, is located on the front surface 19.

Figure 12:
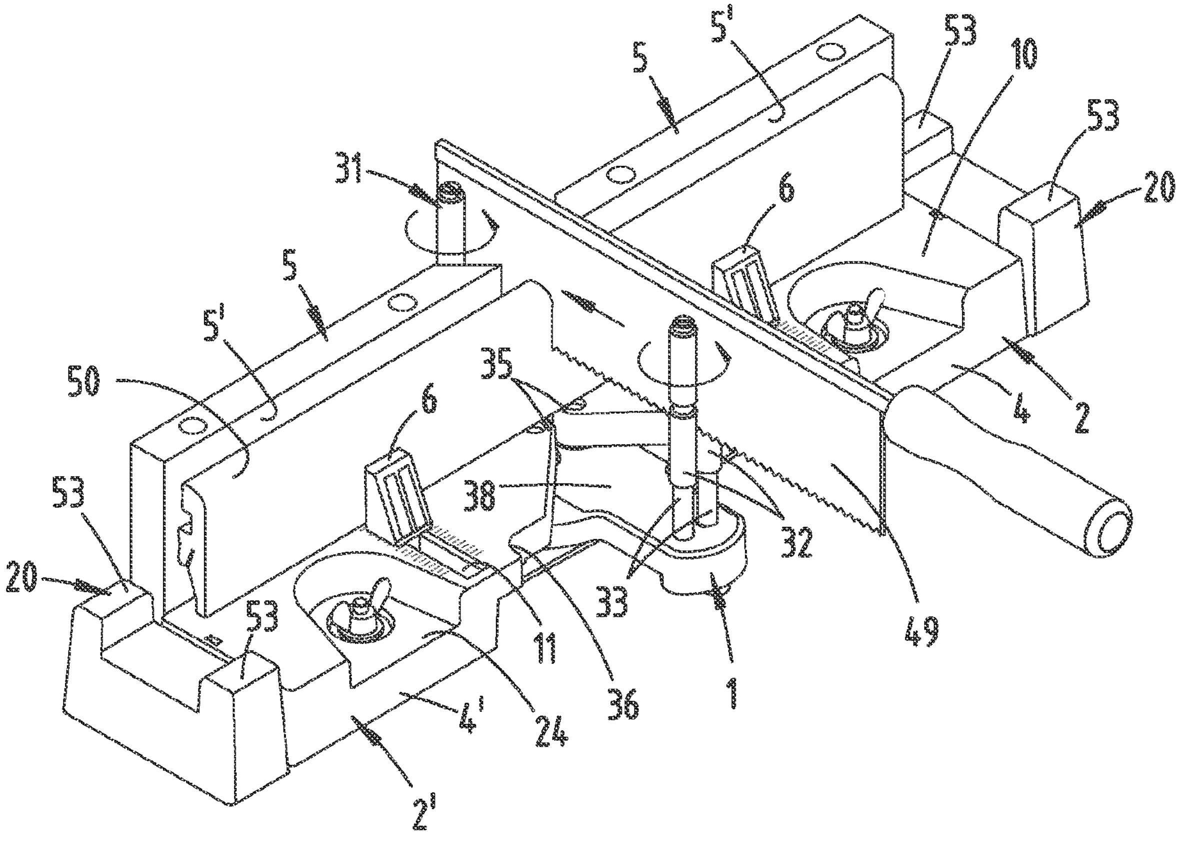
FIG. 12 shows the miter box in another operating position for manufacturing a right-angled cut, wherein the counter stop 6 has a decreased distance from the stop strip 5.

Two bearing supports 20 are provided, which can be used as additional support means for supporting the workpiece 50 (see FIG. 11) or which are secured in a releasable manner to the free end 19 or the front surface, respectively (see FIG. 12). A protrusion 22, which comprises undercut side surfaces and which can be inserted into the dovetail groove 21, protrudes from a broadside surface of the bearing support 20. Other means for securing the bearing support 20 to the front surfaces 19 in a releasable manner can also be provided, for example, a pin can enter into an opening in a latching manner. It is also provided that the bearing support 20 is secured to the limb 2, 2' by means of a releasable threaded connection, in particular a screw.

The top side of the bearing support 20 facing upwards forms a central region, which has the same height from a bottom plane, which the bearing surface 10 has as well. The central region is flanked by two humps 53, the distance of which can be the maximum distance of the counter stop 6 from the stop strip 5. The two bearing supports 20 can be formed by hollow bodies made of plastic.

The maximum distance of the counter contact surface 6' from the contact surface 5' is greater than the minimum distance of the depression 24 from the contact surface 5'. A tool to be cut can extend freely over the depressions 24 thereby.

The bevel flanks 3 of the device are formed by rails 40, which extend in the lower region of the limbs 2, 2'. They are connected to the limb 2, 2' in the region of the rear side of the limb 2, 2', which faces downwards. The bevel flanks 3 extend parallel to the housing longitudinal side of the limb 2, 2'. The bevel flanks 3 formed by the outer edges of the rails 40 can lie flush in the housing longitudinal sides.

The rails 40 have two elongated holes 41, which are located one behind the other in the direction of extension of the rails 40 and with which pins 42 engage, by means of which the rail 40 is connected to the respective limb 2, 2'. The rails 40 can consist of metal.

An end of the rail 40 facing the central element 1 forms a control slit 43, which runs at an angle to the elongated holes 41 and with which a control pin 45 engages, which is connected to the central element 1. When pivoting the limbs 2, 2' with respect to the central element 1, the control pin 45 can move in the control slit 43 in order to displace the rail 40 in the direction of its direction of extension relative with respect to the limb 2, 2' in this way. End sections 44 of the rails 40 thereby move towards one another or away from one another, respectively. In the 90 degree position of the two limbs 2, 2' illustrated in the FIGS. 7 and 8, the end sections 44 are spaced apart as far away from one another as possible. In the extended position illustrated in the FIG. 3, in which the limbs 2, 2' form a 180 degree angle to one another, the tips of the end sections 44 lie one on top of the other, which is a result of the slight height offset of the two rails 40. The two rails 40 are secured to the limbs 2, 2' so as to be height-offset by the material thickness thereof.

Figure 10:
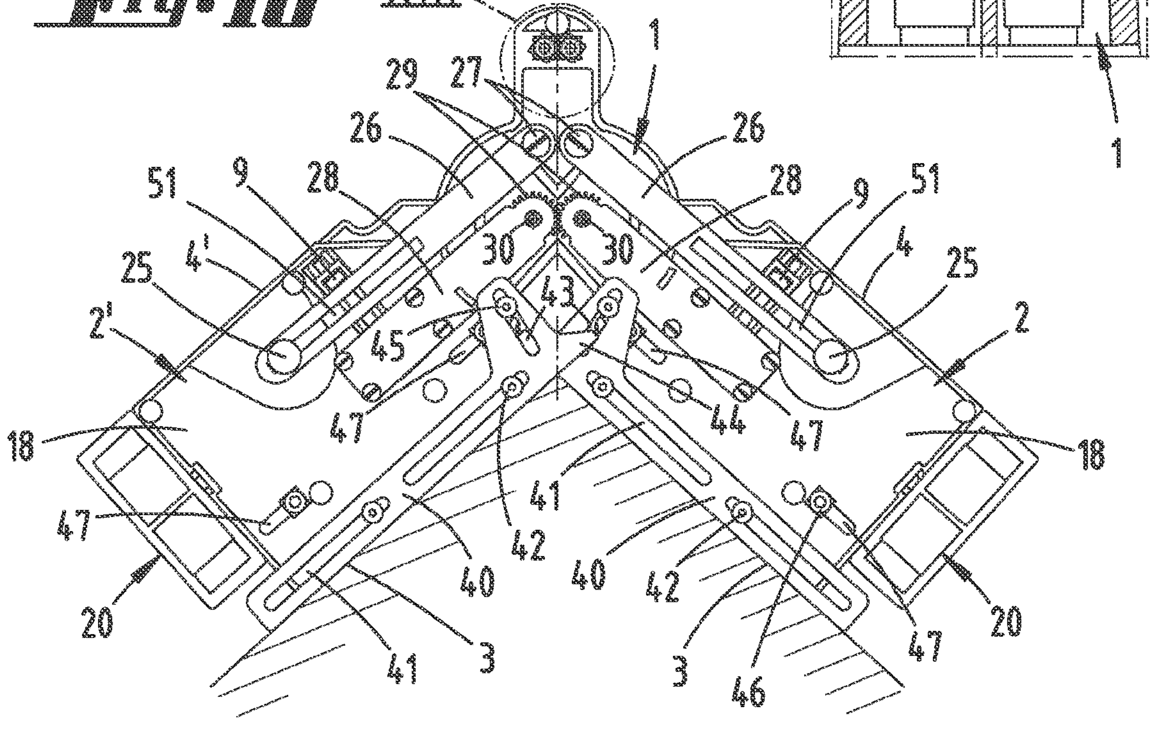
FIG. 10 shows a bottom view of the miter box in the position illustrated in FIG. 9.

If the limbs 2, 2' are displaced farther in the direction of the 270 degree position, then the end sections 44 glide rather one on top of the other, until the outer edges of the rails 40 intersect one another at a right angle in the 270 degree position illustrated in the FIGS. 9 and 10.

Associated with the pivoting of the limbs 2, 2' from the 90 degree position into the 270 degree position, the rails 40 move in the direction of the free end 19 of the limb 2, 2' in each case.

The stop strips 5 can likewise consist of plastic. The stop strips 5, however, are preferably also made of wood. On their sides facing one another, the stop strips 5 have narrow sides, which are cut diagonally and which have a distance from one another, which decreases when the limbs 2, 2' are brought from the 90 degree position into the 270 degree position. To be able to set an optimal width of the slit between the two stop strips 5 in each case, the stop strips 5 are arranged so as to be capable of being shifted or offset, respectively, with respect to the limbs 2, 2'.

Figure 2:
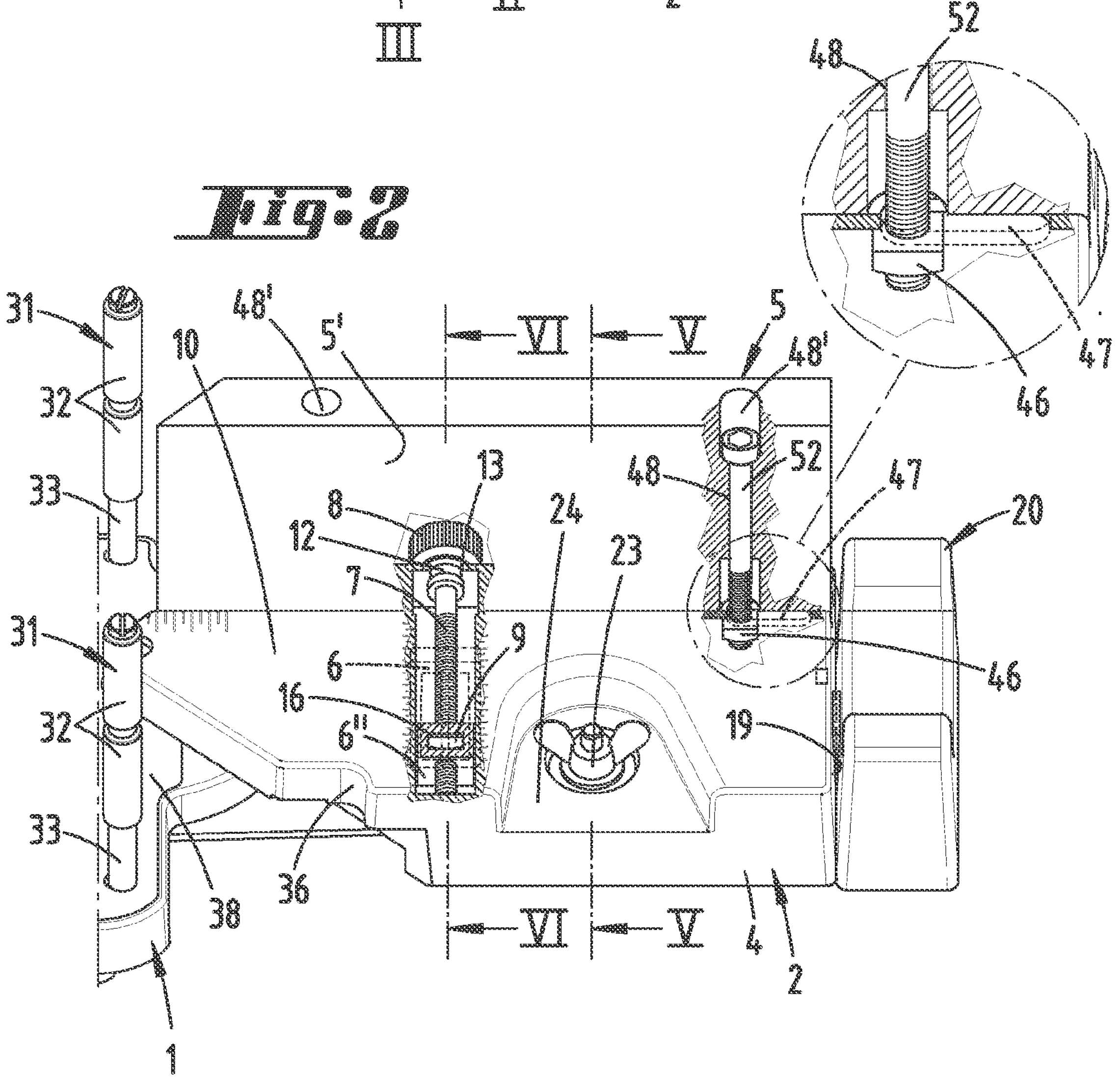
FIG. 2 shows an enlarged section II of the FIG. 1, which is provided with cut-outs.

The FIG. 2 shows securing screws 52, which are inserted in bores 48 of the stop strip 5. A total of two securing screws 52 are provided for one stop strip 5 in each case. The threaded shafts of the securing screws 52 engage through the elongated holes 47 extending in the bearing surface 10 and are screwed into a nut 46 in each case, wherein the nut 46 can be a square nut. By releasing the securing screws 52, the clamping function can be cancelled, so that the stop strip 5 can be shifted in its direction of extension.

The bore, in which the securing screw 52 is located, has a diameter-large section 48', which is open towards the longitudinal side. In particular two diameter-large sections 48' are in particular provided for each bore, so that the stop strip 5 can also be used in a turned position. The stop strip 5 is thus assigned to the limb 2, 2' so as to be capable of being turned. A section 48, which has a smaller diameter, extends between the two diameter-large sections 48', so that the head of the securing screw 52 can support itself on the step between the section 48 of the bore and the upper bore section 48'.

The elongated hole 47 supplies only a limited path, by which the stop strip 5 can be shifted. To offset to stop strip 5 to a greater extent, the securing screw 52 can be released completely from the nut 46 and can be inserted into an adjacent bore 48. By offsetting the securing screw 52 from a first bore 48 into a second bore 48 directly adjacent to said first bore, the width of the slit between the two stop strips 5 can thus be changed gradually.

With respect to its distance x, y, the FIGS. 13 to 17 show adjustable guide elements 31, which serve the purpose of guiding a saw or a knife, by means of which a miter cut can be created into a workpiece by using the device. The distance between the two guide elements and in particular between the sleeves 32 can have the small distance x illustrated in the FIGS. 13 and 14 or the large distance y illustrated in the FIG. 16 or 17.

The central element 1 has elongated holes 57, through which a threaded section 66 of a shaft 33 of the guide elements 31 can engage in each case. An optionally provided sacrificial plate 38 or metal plate 38 can have congruent elongated holes 56, through which threaded sections 66 engage.

In a region adjacent to the threaded sections 66, the shafts 33 have a circular cylindrical circumferential surface. Diameter-smaller threaded sections 66 protrude from this circular cylindrical lower section of the shafts 33, so that steps form, by means of which the shafts 33 can support themselves on the surface of the plate 38 facing upwards.

The underside of the central element 1 has two depressions 55 arranged next to one another, which are connected to one another by means of a free space 65. Each of the two depressions 55 forms a polygonal recess 59. The polygonal recess 59 forms a first profile section 60, which is a square profile section, in which a square nut 58 is received in a rotationally fixed manner in a first rotational position, in which the axes 61 of the shafts 33 have a small distance x. The square profile section 16 forms three corner recesses 62, with which the polygonal corners of the polygonal nut 58 can engage in a rotationally fixed manner in a rotational position, as it is shown by the FIGS. 16 and 17. In this position, the central points 63 of the squares defined by the corner recess 62 have a greater distance than the central points 61 of the squares defined by the square profile sections 16.

Figure 13:
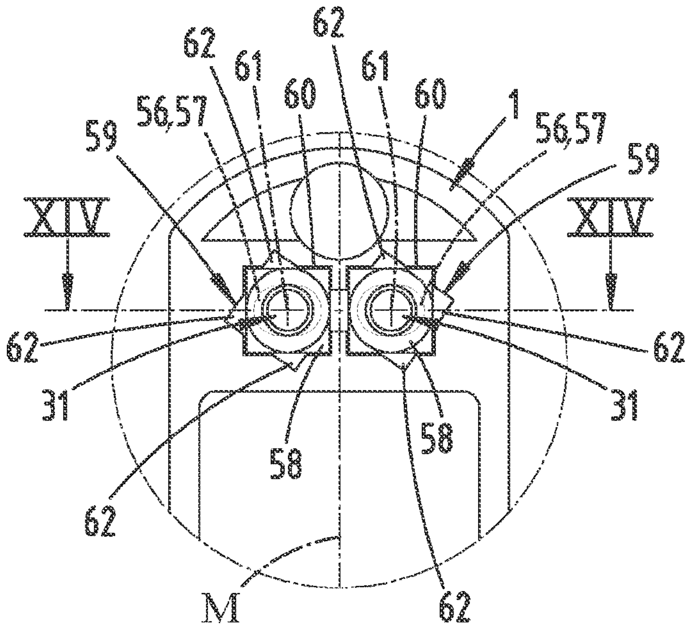
FIG. 13 shows the section XIII in FIG. 10 in an enlarged manner.
Figure 14:
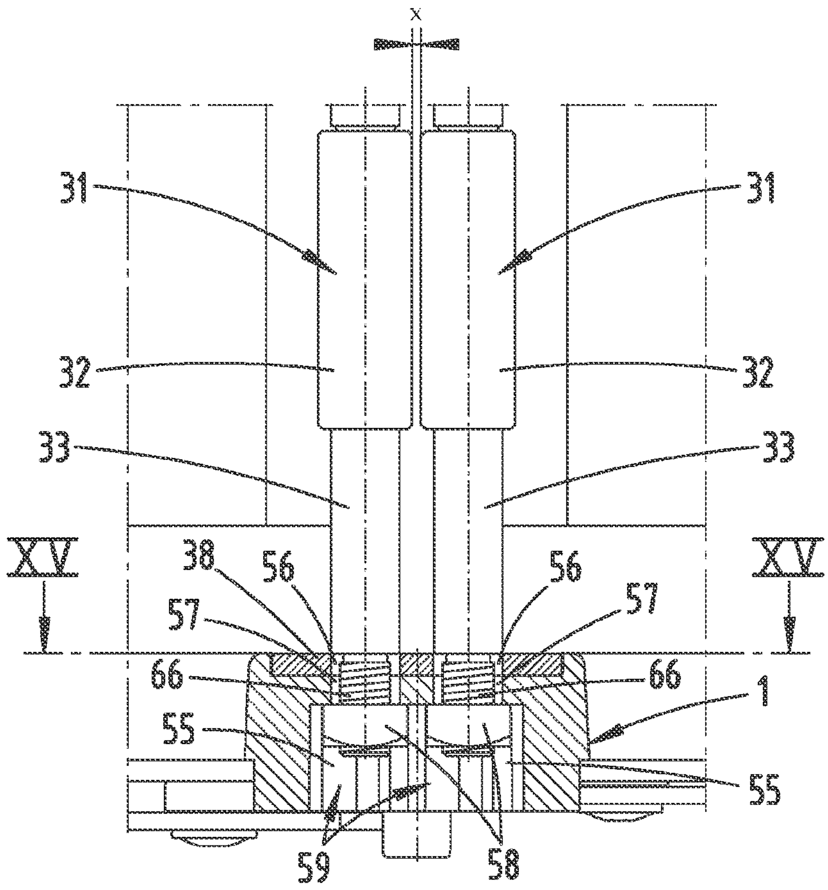
FIG. 14 shows the section according to the line XIV-XIV in FIG. 13.
Figure 15:
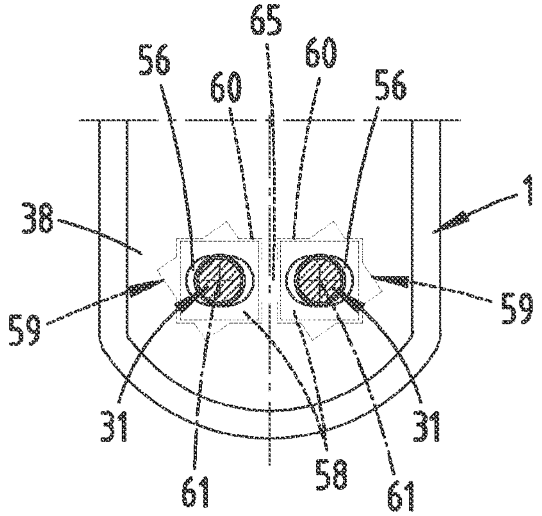
FIG. 15 shows the section according to the line XV-XV in FIG. 14.
Figure 16:
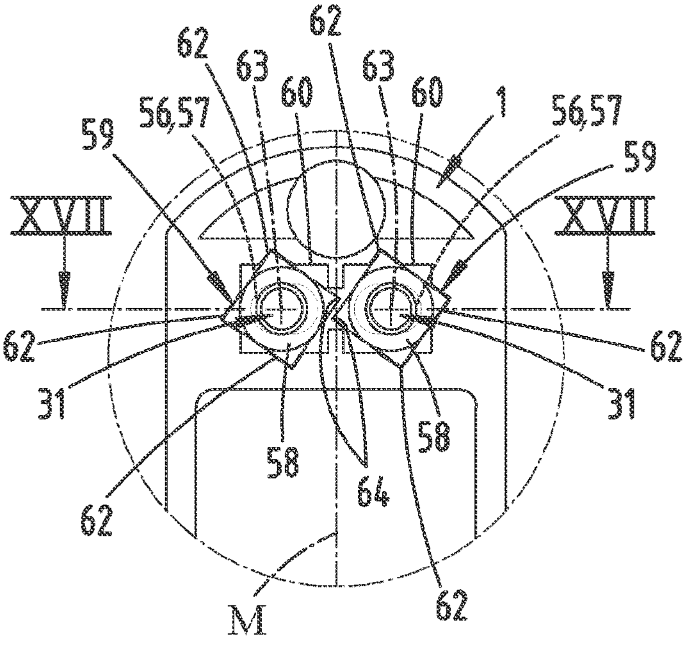
FIG. 16 shows an illustration according to FIG. 13, in which square nuts 58, which lie in polygonal recesses 59, have been rotated
Figure 17:
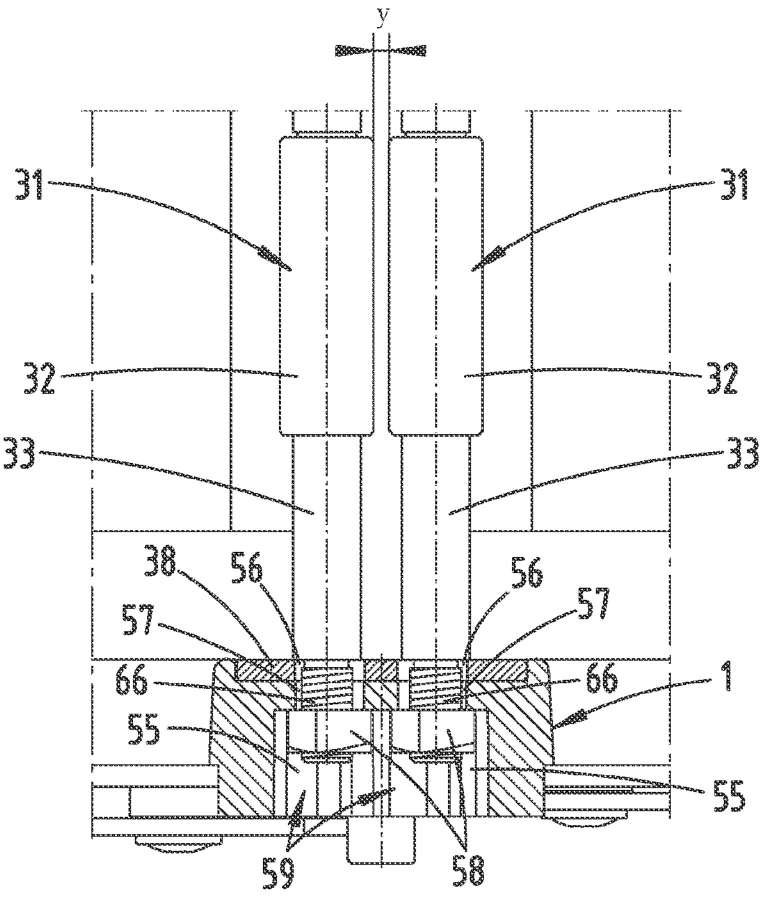
FIG. 17 shows the section according to the line XVII-XVII in FIG. 16.

It can be seen from the FIG. 16 that the rotational position there is angularly offset by less than or more than 45° with respect to the rotational position illustrated in the FIG. 13. In the rotational position illustrated in the FIG. 16, corner regions 64 of the nuts 58 protrude beyond a central line M between the guide elements 31. The central line M represents the movement path of a tool, which is used to cut a workpiece by using the device.

To reposition the guide elements 31, the shafts 33 are rotated about its axis. For this purpose, the front ends of the shafts 33 lying opposite the threaded sections 66 can have screwing tool engagement openings. By rotating the shafts, the threaded sections 66 are unscrewed from the internal threads of the nuts 58, so that, after removal from the depression 55, the nuts can be rotated about an angular amount, which can be less than 45° in the case of the exemplary embodiment.

The above statements serve to describe the inventions, which are captured as a whole by the application and which further develop the prior art at least by means of the following feature combinations, in each case also independently, wherein two, several or all of these feature combinations can also be combined, namely:

A device, which is characterized in that the distance between contact surface 5' and counter contact surface 6' can be adjusted by means of an adjusting element 7, 8, 9.

A device, which is characterized in that the adjusting element 7, 8, 9 has an adjusting spindle 7, which can be rotated by a rotary knob 8 and which is secured to the limb 2 in a rotatable but axially firm manner, wherein the thread of the adjusting spindle 7 engages with a nut 9, which is mounted in a foot 6" of the counter stop 6, which foot 6" protrudes into a slit 11 in a bearing surface 10 of the limb 2.

A device, which is characterized in that rims of the slit 11 engage with recesses 14 of the foot 6" and/or that the foot 6" is guided between two ribs 15 extending below the bearing surface 10 and/or that an annular groove 12 of the adjusting spindle 7 lies in a recess 13 of the limb 2, 2', which is open on one side, which recess 13 is closed from an underside of the stop strip 5 and/or that the annular groove 12 is directly adjacent to the rotary knob 8.

A device for carrying out miter cuts, comprising two limbs 2, 2', which are secured to a central element 1 in a pivotable manner in each case and so as to be fixable in pivoted positions, wherein each limb 2, 2' has a free end 19, to which a bearing support 20 is secured in a releasable manner.

A device, which is characterized in that securing means, by means of which the bearing support 20 is secured to the free end 19, have a dovetail groove 21, with which a protrusion 22 having undercut flanks engages.

A device, which is characterized in that the dovetail groove 21 is open towards an underside of the limb 2, 2' facing away from a bearing surface 10 of the limb 2, 2' and is closed towards its side facing the bearing surface 10.

A device, which is characterized in that the bearing support 20 has a depression 55, which is flanked by two humps or protrusions 53 and which is aligned with a bearing surface 10 in a position of the bearing support 20 secured to the limb 2, 2'.

A device, which is characterized in that the limbs 2, 2' and the central element 1 are made of plastic and a region of the central element 1, from which the guide elements 31, 32, 33 originate and which extends at least over the region between the guide elements 31, 32, 33, either has a metal plate 38 or an exchangeable sacrificial plate 38.

A device, which is characterized in that the metal plate 38 or sacrificial plate 38 lies in a depression 39 of the central element 1 and/or that the metal plate 38 or sacrificial plate 38 has openings, through which pivot axes 30 extend, by means of which ends 35 of the limbs 2, 2' are pivotably hinged to the central element 1.

All of the disclosed features (alone but also in combination with one another) are essential for the invention. The disclosure content of the corresponding/enclosed priority documents (copy of the prior application) is herewith also included in its entirety in the disclosure of the application, also for the purpose of adding features of these documents into claims of the present application. With their features, the subclaims characterize, even without the features of a referenced claim, separate inventive further developments of the prior art, in particular in order to file divisional applications on the basis of these claims. The invention specified in each claim can additionally have one or several of the features, which are in particular provided with reference numerals in the above description and/or which are specified in the list of reference numerals. The invention also relates to designs, in the case of which individual features of the features mentioned in the above description are not realized, in particular insofar as they are evidently dispensable for the respective intended purpose or can be replaced by other technically equivalent means.

List of Reference Numerals

| | |
|---|---|
| 1 | central element |
| 2 | limb |
| 2' | limb |
| 3 | bevel flank |
| 4 | rearward flank |
| 4' | rearward flank |
| 5 | stop strip |
| 5' | contact surface |
| 6 | counter stop |
| 6' | counter contact surface |
| 6" | foot |
| 7 | adjusting spindle |
| 8 | rotary knob |
| 9 | nut |
| 10 | bearing surface |
| 11 | slit |
| 12 | annular groove |
| 13 | recess |
| 14 | recess |
| 15 | rib |
| 16 | cage |
| 17 | side wall |
| 18 | cavity |
| 19 | free end, front surface |
| 20 | bearing support |
| 21 | dovetail groove |
| 22 | protrusion |
| 23 | actuating element, wing nut |
| 24 | depression |
| 25 | clamping screw |
| 26 | fixing lever |
| 27 | rotary bearing |
| 28 | pivot arm |
| 29 | toothing |
| 30 | pivot axis |
| 31 | guide pin |
| 32 | sleeve |
| 32' | front end |
| 33 | shaft |
| 34 | spring tongue |
| 34' | protrusion |
| 35 | acute-angled end |
| 35' | side wall |
| 36 | nook |
| 37 | nook |
| 38 | sacrificial plate, metal plate |
| 39 | recess |
| 40 | rail |
| 41 | elongated hole |
| 42 | pin |
| 43 | control slit |
| 44 | end section |
| 45 | control pin |
| 46 | nut |
| 47 | elongated hole |
| 48 | bore |

-continued

| List of Reference Numerals | |
|---|---|
| 48' | upper bore section |
| 49 | saw |
| 50 | workpiece |
| 51 | elongated hole |
| 52 | securing screw |
| 53 | hump |
| 54 | annular groove |
| 55 | depression |
| 56 | elongated hole |
| 57 | elongated hole |
| 58 | square nut |
| 59 | polygonal recess |
| 60 | square profile section |
| 61 | central point |
| 62 | corner recess |
| 63 | central point |
| 64 | corner |
| 65 | free space |
| 66 | threaded section |
| x | distance |
| y | distance |
| M | central line |

The invention claimed is:

1. A device for carrying out miter cuts comprising guide elements (31) secured thereto, wherein each guide element is formed by two adjacent guide pins (31), wherein the guide pins (31) have a shaft (33), on which at least one sleeve (32) is rotatably mounted, wherein the sleeve (32) has a spring tongue (34), which engages with a protrusion (34') with an annular groove (54) of the shaft (33).

2. The device according to claim 1, wherein several sleeves are arranged axially one behind the other on a shaft (33).

3. The device according to claim 1, wherein the sleeves (32) comprise plastic.

4. The device according to claim 1, wherein the spring tongue (34) is assigned to a front end (32') of the sleeve (32).

5. The device according to claim 1, wherein the spring tongue (34) extends between two notches open from the front end (32').

6. The device according to claim 1, wherein the protrusion (34') is arranged on the free end of the spring tongue (34).

7. The device according to claim 1, wherein the guide element (31) is assigned to a central element (1), to which two limbs (2, 2') are secured, which are pivotable and so as to be fixable in pivoted positions.

8. A device for carrying out miter cuts comprising a central element, two limbs extending from the central element, and guide elements (31, 32, 33) secured to the central element and being configured for guiding a saw, wherein one or several bodies of the device are made of plastic and a region of one of the bodies, from which guide elements (31, 32, 33) originate, extends at least over the region between the guide elements (31, 32, 33), and either has a metal plate (38) or an exchangeable sacrificial plate (38), wherein the metal plate (38) or sacrificial plate (38) lies in a recess (39) of the central element (1) and has openings, through which pivot axes (30) extend, by means of which ends (35) of the limbs (2, 2') are pivotably hinged to the central element (1).

9. The device according to claim 1, wherein the distance (x, y) between the guide elements (31) can be changed.

10. The device according to claim 9, wherein the guide elements (31) form a shaft (33) in each case, which is screwed into a nut (58) with a threaded section (66).

11. The device according to claim 10, wherein the threaded section (66) is inserted in a non-round nut (58), which can assume different rotational positions in a non-round recess (59), wherein the guide elements (31, 32, 33) have distances (x, y), which differ from one another, in the different rotational positions.

12. The device according to claim 11, wherein in a first rotational position of the nuts (58) having a polygonal outline, polygonal flanks of the nuts (58) run parallel to one another and in a second rotational position, polygonal corners (64) protrude beyond a central line (M) between the two guide elements.

13. The device according to claim 1, further comprising at least four guide pins (31), which carry two sleeves (32) in each case, which are arranged one on top of the other in the axial direction, wherein the sleeves (32) are secured rotatably but axially non-displaceably to the shaft (33) and/or wherein the sleeves (32) comprise plastic and the shaft (33) comprises metal.

14. The device according to claim 7, wherein the limbs (2, 2') can be pivoted from a first right-angled position, in which the contact surfaces (5') are at a first 90 degree angle to one another, into an extended position, in which the contact surfaces (5') are aligned with one another, and the limbs (2, 2') can be pivoted beyond the extended position all the way into a second right-angled position, in which the contact surfaces (5') are at a 270 degree angle to one another.

15. The device according to claim 7, wherein the central element (1) forms two pivot axes (30), to which acute-angled ends (35) of the limbs (2, 2') are pivotably hinged to the central element (1), wherein side walls (35') of the acute-angled ends (35) run at an angle of maximally 90 degrees to one another or less than 90 degrees to one another and/or wherein in a region spaced apart from the pivot axis (30), the side walls (35') have nooks (36, 37), into which guide elements (31, 32) enter in the first right-angled position or the second right-angled position.

16. A device for carrying out miter cuts comprising two limbs (2, 2'), which are secured to a central element (1) in a pivotable manner in each case and so as to be fixable in pivoted positions, wherein each limb carries a stop strip (5) comprising a contact surface (5'), which is secured to the limb (2, 2') so as to be capable of being shifted and/or offset in its direction of extension, wherein the stop strip (5) is secured to the limb (2, 2') by means of a releasable connection (52, 46) by means of securing elements (52) engaging through bores (48) of the stop strip (5) and elongated holes (47) of the limb (2, 2'), wherein the elongated holes (47) extend in the bearing surface (10).

17. The device according to claim 16, wherein the stop strip (5) can be turned about an axis parallel to the direction of extension of the limb (2, 2') and/or about an axis perpendicular thereto.

18. The device according to claim 16, further comprising bores (48) arranged next to one another in pairs, into which a securing screw (52) can optionally be inserted.

19. The device according to claim 18, wherein the bores (48) have sections (48'), which are diameter-enlarged towards both of their opening sides in each case.

20. The device according to claim 19, wherein the bores (48) extend between two longitudinal narrow sides of the stop strip (5).

21. The device according to claim 1, further comprising two limbs (2, 2'), which are secured to a central element (1) in a pivotable manner in each case and so as to be fixable in pivoted positions and comprising a blocking means, by means of which the pivotability of the limbs (2, 2') can be blocked, wherein the blocking means has an actuating element (23), which can be brought from a release position into a blocking position, wherein each limb (2, 2') has a bearing surface (10) for supporting a workpiece, wherein the two bearing surfaces (10, 10') of the two limbs (2, 2') lie in a common plane, and the actuating elements (23) are arranged in a depression (24) of the bearing surface (10) and do not protrude beyond the bearing surface (10).

22. The device according to claim 21, wherein the actuating element (23) is a nut, which is screwed to a clamping screw (25), which engages with an elongated hole (51) of a fixing lever (26), the fixed end of which is secured to the central element (1) by means of a rotary bearing (27).

23. The device according to claim 16, wherein the stop strip (5) has two long narrow sides located opposite one another, in which the bores (48) are arranged and has two short narrow sides located opposite one another, wherein a narrow side runs obliquely to the contact surface (5') and the other runs at a right angle to the contact surface (5').

24. The device according to claim 16, wherein bores (48) for receiving securing screws (52) are approximately equidistantly spaced apart from a narrow outer edge of the contact surface (5').

* * * * *